May 3, 1966 H. BENMUSSA ETAL 3,249,698
PENTACONTA SEMI-ELECTRONIC TELEPHONE SYSTEM
Filed Dec. 3, 1962
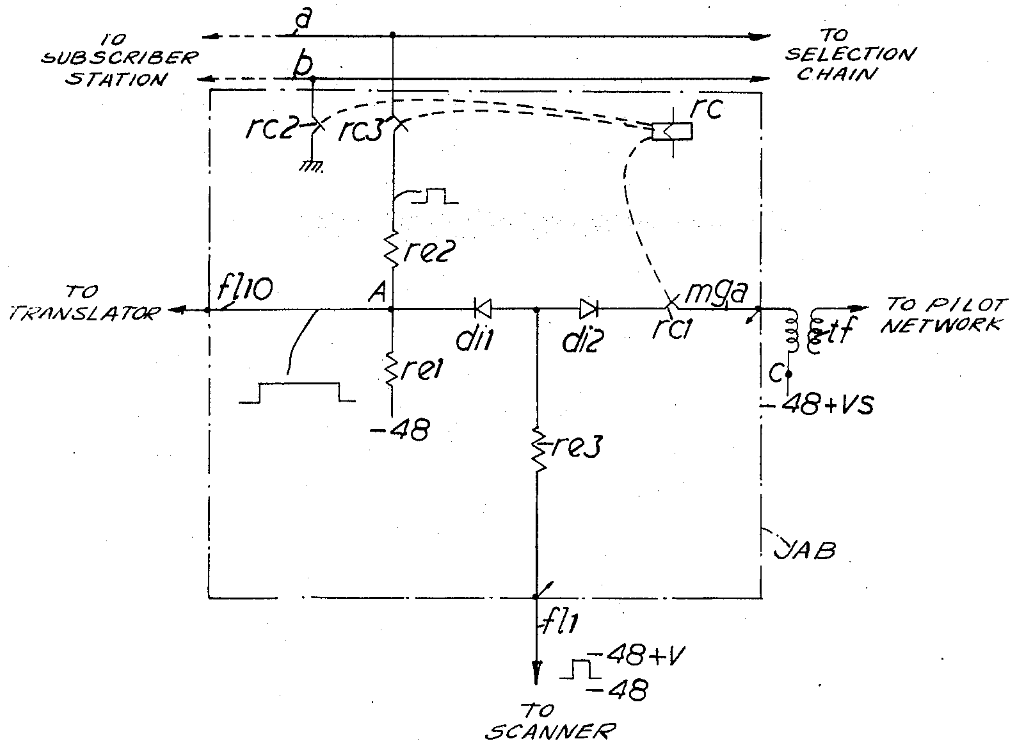
Inventor
H. BENMUSSA
P.R.L. MARTY
S. KOBUS
By [signature]
Attorney United States Patent Office 3,249,698

Patented May 3, 1966

3,249,698
PENTACONTA SEMI-ELECTRONIC TELEPHONE SYSTEM

Henri Benmussa, Meudon, and Pierre René Louis Marty and Stanislas Kobus, Paris, France, assignors to International Standard Electric Corporation, New York, N.Y., a corporation of Delaware Filed Dec. 3, 1962, Ser. No. 241,737
Claims priority, application France, Dec. 15, 1961, 882,062, Patent 80,796
1 Claim. (Cl. 179—18)

This invention relates in general to a selection system for automatic telephone exchanges and in particular to a simplified two-wire line circuit having a single control relay therein.

In known telephone systems, a call connection between a calling subscriber and a called subscriber includes a calling line circuit, a first selection chain, a local junctor or feed junctor, a second selecting chain, and a called line circuit. The selection chains may consist of well-known crossbar multiswitches or the equivalent and the feed junctors may be of the type disclosed in our copending patent application, Serial No. 189,919 filed April 24, 1962 and entitled "Telephone System With Electronic Selection."

In the establishment of a connection, a common marker recognizes a calling condition and marks the calling end of the first selection chain and all available feed junctors which may be assigned for handling the call. The common register and translator equipment through the noted marker marks the calling subscriber end of the second selection chain and the feed juncfor assigned the calling line. Thereafter, a by-path network selects a single routing path through the first and second selection chains which could be used to interconnect the calling and called subscribers. The noted path is selected by the transmission of a pilot signal through the by-path network in the manner described in our noted copending application. After such a single path is selected, the magnets of the selection chains are operated to complete the telephone connection.

In the noted copending application, the subscriber junctor or line circuit utilizes conventional line and cut-off relays. The principal object of this invention is to simplify the noted line circuit by reducing the number of components therein.

An object of the present invention is to provide "and" type gating means in the line circuit which responds to the energization of a first inlet thereof when the line circuit is in a calling or called condition and which responds to the energization of a second inlet at predetermined time intervals to cause a signal to be transmitted to the pilot network in order to start selection operations in the marker.

A related feature is concerned with the circuit arrangement wherein the current flowing in the calling line loop causes a change of potential which energizes the noted first inlet of the gating means.

Another feature is concerned with the circuit arrangement wherein a called line condition, under control of translating equipment, marks the noted first inlet of the gating means to signal a called condition.

Still another object is to provide distinguishing potentials on the noted first inlet of the gating means to discriminate between a calling and called indication. This is accomplished by placing a steady potential on the first inlet of the gating means when a calling condition exists and by placing a pulsating potential on this inlet when a called condition exists.

Another feature is to provide a control relay in the line circuit which remains operated by residual magnetism to thereby obviate the necessity of a third control wire.

Other objects and features of the invention will become apparent and the invention will be best understood when the specification is read in conjunction with FIG. 1 of the drawings which shows a circuit arrangement of a typical line circuit.

Referring now to the drawing, the line wires *a* and *b*, on the left hand side of the drawing, are connected to a subscriber station (not shown) assigned thereto. On the right hand side of the drawing, these wires are connected to the selection chain extending to the feed junctor. A single cut-off relay *rc* is provided which is directly energized from the marker as described in the noted copending application.

Wire *fl*1 is a control wire from the line circuit scanning equipment (not shown) which is energized at discrete time intervals when a call is to be handled, as a result of either a calling condition or a called condition. The marking wire *mga* is a portion of the noted pilot network for selecting a path from the calling subscriber to the called subscriber.

*Idle line condition*

When the subscriber's station is idle, a negative potential of 48 volts appears at point A. At this time, cut-off relay RC is restored and its three contacts *rc*1, *rc*2 and *rc*3 are in their closed condition.

The scanning equipment serving the subscriber is continually operating. When the scanner arrives at the position assigned the line circuit JAB, the potential on wire *fl*1 is changed sufficiently to cause current to flow through diode *di*1 to point A and through resistor *re*1 to negative 48 volts. The circuit components are so selected that point A is normally at a lower potential than point C which is associated with the transformer shown at the right hand side of the drawing. At this time, diode *di*2 is non-conducting and no current flows through the windings of the noted transformer. Thus, no pilot signal is fed to the pilot network to select a switching path.

*Calling line condition*

When the subscriber served by circuit JAB initiates a call, the line connectors *a* and *b* are looped and current flows from ground through the closed loop to the negative 48 volts connected to resistor *re*1. At this time, the potential at point A assumes a negative potential of approximately 25 volts. When the line scanner becomes positioned on circuit JAB, the potential on wire *fl*1 causes current to flow from wire *fl*1 through diode *di*2 and the winding of the transformer to point C. At this time, diode *di*1 is non-conductive.

The change in potential appearing through the winding of the transformer causes the pilot network to select a path from the subscriber line circuit to a local feed junctor. When an idle path is determined, a signal is returned to the marker stopping the scanner. Thereafter, the marker proceeds to extend a connection through the first selecting chain to an idle one of the available feed junctors. At this time, the marker operates cut-off relay *rc* which terminates the transmission of a pilot signal and precludes any line interruptions from being effective. The cut-off relay *rc* is held operated by residual magnetism.

The telephone number of the desired subscriber is then dialed and the system operates in the manner described in our noted application to extend a connection to the desired called subscriber.

When the call is completed, the marker again is operated and restores the cut-off relay *rc* by the transmission of a suitable de-magnetizing current. The subscriber line circuit JAB is then returned to normal condition.

*Called line condition*

When a line is called, the translating equipment (not shown) causes a pulsed potential to appear on wire *fl*10 of the line circuit assigned the called line. Each impulse lowers the potential at point A to a negative 25 volts. The line circuit is then repeatedly placed in the same condition as if the line were in a calling condition. It is necessary that the duration of the pulses appearing on wire *fl*10 be longer than a scanning cycle pulse duration. The scanner, by means not shown discriminates between the pulsed potential appearing on point A indicating a called condition and the noted steady potential appearing thereon indicating a calling condition in order to preclude a terminating call from being connected to a calling line which may be in a calling condition at the same instant. With the noted lower potential appearing on point A and the scanner being positioned on circuit JAB, a signal is sent through the winding of the transformer as hereinbefore noted. The pulse network is then activated to cause the selection and ultimate connection of the calling line to the called line.

*Called line busy*

If the called line is busy, the cut-off relay *rc* is operated and break contacts *rc*1 are opened to preclude the transmission of a signal to the pulse transformer. Thus, the marker does not receive a signal from a selected feed junctor and the scanner advances to the next line circuit.

While the principles of the invention have been described above in connection with specific apparatus and applications, it is to be understood that this description is made only by way of example and not as a limitation on the scope of the invention.

What is claimed is:

A line circuit for use in a telephone system comprising:

gating means having a first input terminal, a second input terminal and an output terminal;

said first input terminal being connected to receive a steady signal indicating a calling condition;

said second input terminal being connected to receive a scanning signal;

said gating means responding to simultaneous applications of said signals on said first input terminal and on said second input terminal, respectively, to provide an output signal on said output terminal, said output signal thereby being made available for use in extending connections between calling and called lines;

said first input terminal being connected to receive a pulsating signal indicating a called condition to enable said gating means;

a first diode, biased to be normally conductive coupled between said first input terminal and said second input terminal;

a second diode, biased to be normally nonconductive coupled between said second input terminal and said output terminal, and said first diode and said second diode responding to the simultaneous application of said signals to said first and second input terminals to reverse their conductivity states to provide said output signal through said second diode.

References Cited by the Examiner

UNITED STATES PATENTS

| | | | |
|---|---|---|---|
| 2,714,629 | 8/1955 | Oberman | 179—18 |
| 2,829,203 | 4/1958 | Pitlik | 179—18 |
| 2,979,571 | 4/1961 | Libois et al. | 179—18 |
| 3,025,356 | 3/1962 | Muroga et al. | 179—18 |
| 3,059,058 | 10/1962 | Abbott | 179—18 |
| 3,102,168 | 8/1963 | Cirone et al. | 189—18 |
| 3,157,746 | 11/1964 | Lowry | 179—18 |

ROBERT H. ROSE, *Primary Examiner.*

WALTER L. LYNDE, *Examiner.*

S. H. BOYER, *Assistant Examiner.*